Feb. 10, 1942. G. W. WACKER 2,272,449

PLASTIC INJECTION MOLDING CARTRIDGE

Original Filed Aug. 16, 1938

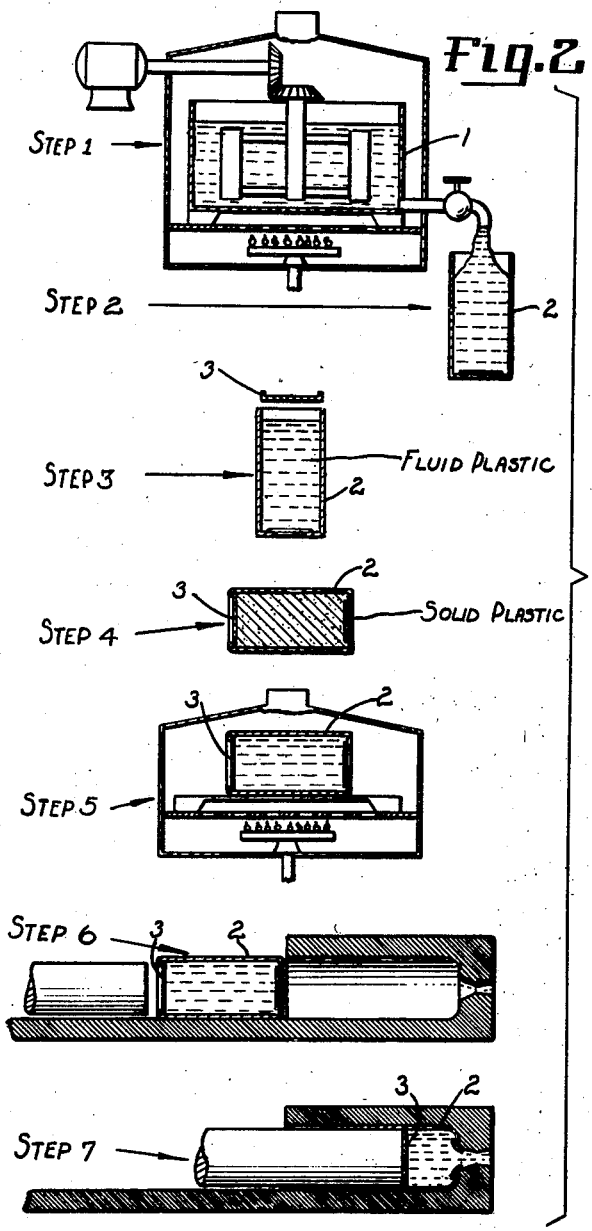

Fig.1

- STEP 1 → MANUFACTURING PLASTIC
- STEP 2 → POURING PLASTIC INTO CARTRIDGE
- STEP 3 → SEALING PLASTIC IN CARTRIDGE
- STEP 4 → COOLING PLASTIC IN CARTRIDGE
- STEP 5 → REHEATING PLASTIC IN CARTRIDGE
- STEP 6 → LOADING CARTRIDGE IN MACHINE
- STEP 7 → EJECTING PLASTIC IN HEATED CONDITION

Fig.3

INVENTOR
GEORGE W. WACKER
BY
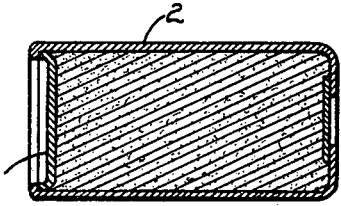
ATTORNEYS

UNITED STATES PATENT OFFICE 2,272,449

PLASTIC INJECTION MOLDING CARTRIDGE

George W. Wacker, Cincinnati, Ohio, assignor to The Grotelite Company, Bellevue, Ky., a corporation of Kentucky Original application August 16, 1938, Serial No. 225,181. Divided and this application April 21, 1939, Serial No. 269,224

1 Claim. (Cl. 206—56)

My invention relates to a package or cartridge which is filled with a plastic extrusion material for use in an injection machine adapted to eject the material directly from the cartridge.

It is the object of my invention to provide a cartridge filled with a plastic extrusion material which may be used in a plastics injection machine so that the use of plastic materials in loose powder or granular form may be eliminated and so that the accuracy of measurement of the injected material may be increased with a constant decrease of the plastic material waste.

It is a further object of my invention to provide a cartridge that can be preheated so that it can be inserted in the plastic injection machine in its heated condition.

It is a further object of my invention to provide such a cartridge that the molding material therein may be preheated to molding temperature exteriorly of the injection machine without injury to the material.

A more particular object of this invention is to load a cartridge by pouring or forcing plastic material into the cartridge and thereafter preferably hermetically sealing the cartridge.

It is an object of my invention to eliminate the process of grinding the plastic material and to eliminate the subsequent use of such ground material which has to be fed to a plastic machine in granular form and heated as it is fed. This results in an irregular feeding, a difficult heating and a slowing down of the production of the machine due to the necessity of preheating each granular charge. The granular charge sticks in the machine, making it difficult to feed uniform amounts and is wasteful in its handling.

By this invention, I use the rigid or semi-rigid plastic material which is poured directly into a cartridge and is sealed therein. It can then be preheated while still in its solid condition and ejected as set forth in the application of George W. Wacker, Serial No. 195,591, filed March 12, 1938.

This application is a division of my copending application, Serial No. 225,181, filed August 16, 1938.

Referring to the drawing:

Figure 1 is a diagrammatic view of the several steps of the invention.

Figure 2 is a diagram of the apparatus used to effect the steps of the process.

Figure 3 is a section through a cartridge having a load of solid plastic material with which it has been filled while the plastic is in its liquid or semi-liquid condition.

Referring to the drawing in detail, the first step in the process is to manufacture the plastic in the container 1 (or by any conventional means), and after the completion of its manufacture while it is still in its liquid or semi-liquid, or plastic, state, it is poured, as the second step, into the cartridge 2. Then it is immediately sealed, as step 3, by the cover 3 being applied to the cartridge 2. Any one of the types of cartridge shown in the above mentioned Wacker application Ser. No. 195,591 may be employed.

Thereafter as step 4, it is cooled and ready for storage or shipment. When it is ready for use, the solid plastic within the sealed cartridge is heated. This is step 5.

The temperature can gradually be brought up until the plastic is again sufficiently plastic due to heat, but without oxidation, to be ejected from the cartridge when it is loaded in the injection machine. It is then loaded in the injection machine, step 6, and ejected by applying pressure to one end and forcing the material through a ruptured container or cartridge at the other end. This is step 7.

It is therefore seen that my method comprises the steps of making the plastic in liquid or semi-liquid condition, pouring it in such condition into a container, such as a cartridge, sealing it, cooling it, reheating it while sealed and thereafter immediately placing it in heated condition in the ejection machine.

I find that this is desirable with certain types of plastics in preference to filling the cartridge with granular plastics. A much smaller cartridge can be employed. A far more accurate quantity can be measured. The size of the cartridge can be reduced thereby reducing the size of the machine and the bulk of the cartridges in shipping. The heating problem without oxidation is successfully solved.

In handling certain materials, such as Styrene, Lucite and similar compounds of very friable nature or requiring very high pressure to force into the mold, much difficulty has been experienced due to some of the material being forced into the clearance space between the plunger and its cylinder wall, resulting in a "stuck" plunger.

An extremely close fit between the cylinder and plunger, with the practical elimination of running clearance, so that no space exists for the material to crowd in, results, in practice, in gouged cylinders due to mechanical friction, unless very hard and costly materials are employed. Some improvement might be obtained by allowing an excessive clearance between plunger and cylinder, resulting in a comparatively thick skin of leaking material. Difficulty in keeping the plunger central, with a uniform wall of leaking material separating it from the cylinder wall, precludes the use of this method in practice. The cartridge system overcomes these difficulties.

By the use of the cartridge system, the act of collapsing the cartridge upon its contents under very heavy pressure, has the additional very desirable effect of forcing the material of the cartridge into close contact with the sides of the cylinder. This contact is closer than possible with a running fit between piston and cylinder, and prevents the material from finding its way into this space and jamming. As the crushed cartridge is expelled at the end of the stroke, this operation consists virtually of fitting a very tight fitting seal between the end of the plunger and the actual material to be extruded, because not only is the clearance space sealed, but the material of the cartridge is interposed between the molding material and the end of the plunger. In this way, molding materials that give much trouble with ordinary self-heating molding machines are readily handled by the cartridge method.

With ordinary self-heating injection molding machines, a substantial portion of the working stroke of the injection plunger is used for feeding a fresh charge of material into the heating cylinder, and the effective stroke forcing the plasticized material into the mold at high pressure, does not commence until this feeding of new material has been accomplished.

By using the cartridge system, practically the entire stroke of the injection plunger is made effective, and is utilized for the injection of material into the mold. The only portions of the stroke not utilized for useful work are the slight clearance provided to assure proper entrance of the cartridge into the cylinder, and such part of the stroke as is necessary to eject the exhausted cartridge. Therefore, a machine using the cartridge method has a capacity from two to three times as great as the conventional type.

In connection with the above, it should also be observed that the conventional type of machine, using material in loose powder form, must lose some of the plunger travel in compressing this loose material to the point where the great pressure of the plunger may be transmitted through the new charge, to the plasticized charge awaiting transfer to the mold.

The conventional type of molding machine uses molding powder that has been ground to a certain size of particle. By the use of the cartridge method, the necessity of converting the manufactured stock into a powder of certain size is eliminated, and the stock may be inserted into suitable cartridges or containers during the process of manufacture. In this way a substantial saving in production cost is effected.

Another advantage lies in the fact that gates and sprues may be packed into the cartridges, together with enough other material to make the required weight, without the necessity of cutting them up or grinding them into a powder.

By filling cartridges with dense material during the process of manufacturing the molding compounds, instead of using the material in the powdered form, an increase of almost one hundred per cent in volume is obtained. The proportion of loose to compressed material is approximately 2.5 to 1, but allowance must be made for some space loss in filling and for the material of the cartridge.

The conventional type of molding machine, with its self contained heater, possesses an inherent fault in that the temperature of the heating element must obviously be higher than the plasticizing temperature of the material. This temperature differential depends upon many factors, but it will be readily seen that a temporary delay in the operation of the machine, resulting in subjecting the material in the heating chamber to this higher temperature for a period longer than normal, will also result in overheating of the charge, causing "bleeding" or oozing of the material from the open end of the chamber. To minimize the effects of this "bleeding," it is customary to provide the injection nozzle with a comparatively small orifice, thereby interposing some resistance to this bleeding, and reducing it to within practical limits. This small orifice, or restriction, necessarily limits the passage of the plasticized material into the mold, and slows up the injection process in proportion to the restriction.

By using the cartridge principle, there is no heating element to be kept at a temperature higher than that of the cartridge when it is placed in the machine. Therefore, there is no necessity for the restricted nozzle essential to the operation of the conventional machines, and the orifice can be of such size as will permit the injection of the material into the mold in the shortest possible time, or with a greatly reduced pressure.

In considering the above, it must be recalled that the cartridge may be of such size as to require its entire contents to fill the mold. Or it may contain enough plasticized material to permit filling the mold many times before becoming emptied. In either case, the large nozzle orifice may be used.

It will be understood that I desire to comprehend within my invention such modifications as may be necessary to adapt it to varying conditions and uses.

Having thus fully described my invention, what I claim as new and desire to secure by Letters Patent, is:

A package comprising a cartridge containing a thermosetting molding material, said cartridge being indestructible when heated to a temperature at which the molding material can be injection molded, said cartridge comprising a casing of uniform cross-section having hermetically sealed ends, one of said ends being constructed and arranged to permit rupture thereof upon the application of injection pressure upon the opposite end to permit ejection of the molding material from the cartridge, said opposite end forming a plunger for forcing the contents through said rupturable end.

GEORGE W. WACKER.